US009286306B2

(12) United States Patent
Morisawa

(10) Patent No.: US 9,286,306 B2
(45) Date of Patent: Mar. 15, 2016

(54) DOCUMENT IMAGE MANAGEMENT DEVICE AND DOCUMENT IMAGE MANAGEMENT METHOD

(75) Inventor: Shuichi Morisawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 993 days.

(21) Appl. No.: 12/046,621

(22) Filed: Mar. 12, 2008

(65) Prior Publication Data

US 2008/0228732 A1 Sep. 18, 2008

(30) Foreign Application Priority Data

Mar. 14, 2007 (JP) ................................. 2007-065266
Jan. 18, 2008 (JP) ................................. 2008-009542

(51) Int. Cl.
*G06F 7/00* (2006.01)
*G06F 17/00* (2006.01)
*G06F 17/30* (2006.01)

(52) U.S. Cl.
CPC .... *G06F 17/30112* (2013.01); *G06F 17/30126* (2013.01)

(58) Field of Classification Search
None
See application file for complete search history.

(56) References Cited

U.S. PATENT DOCUMENTS

| | | | | |
|---|---|---|---|---|
| 7,484,220 | B2* | 1/2009 | Kelley et al. | 714/15 |
| 7,849,099 | B2* | 12/2010 | Kamekawa | 707/781 |
| 2002/0144068 | A1* | 10/2002 | Ohran | 707/204 |
| 2003/0196167 | A1* | 10/2003 | Dewar | 715/507 |
| 2004/0012802 | A1* | 1/2004 | Allen et al. | 358/1.13 |
| 2005/0024513 | A1* | 2/2005 | Hayashi et al. | 348/333.01 |
| 2005/0246325 | A1* | 11/2005 | Pettinati et al. | 707/3 |
| 2005/0278331 | A1* | 12/2005 | Hatori | 707/7 |
| 2006/0287999 | A1* | 12/2006 | Kawabata et al. | 707/5 |
| 2007/0038606 | A1* | 2/2007 | Yamada et al. | 707/3 |
| 2007/0078771 | A1* | 4/2007 | Allin et al. | 705/52 |
| 2007/0240098 | A1* | 10/2007 | Averett et al. | 717/104 |
| 2008/0126979 | A1* | 5/2008 | Abe et al. | 715/781 |

FOREIGN PATENT DOCUMENTS

| | | |
|---|---|---|
| JP | 7239854 A | 9/1995 |
| JP | 8-335010 A | 12/1996 |
| JP | 10-254719 A | 9/1998 |
| JP | 11250053 A | 9/1999 |
| JP | 2002032388 A | 1/2002 |
| JP | 2003308236 A | 10/2003 |

OTHER PUBLICATIONS

Japanese Official Action cited in Japanese counterpart application No. JP2013-148627, dated Jan. 28, 2014. Partial English translation provided.

* cited by examiner

*Primary Examiner* — Jau-Shya Meng
(74) *Attorney, Agent, or Firm* — Rossi, Kimms & McDowell LLP

(57) ABSTRACT

The present invention is to improve user operability when the same operation is repeated on a document image management device. A device having a executing unit for receiving selection of processing to be executed on a file or folder from an operator, and executing the processing, which selection is received, on the file or folder, includes: a search unit for searching for a file or folder on which the processing has been executed in the past in the executing unit when receiving the selection of the processing from the operator; and an operation target display unit for showing on a display screen the identification information on the file or folder searched for by the search unit.

13 Claims, 25 Drawing Sheets

| | |
|---|---|
| CHECK-OUT | CHECK-IN |
| GROUP CREATION | USER REGISTRATION |
| USER CREATION | GROUP REGISTRATION |
| DOCUMENT REGISTRATION | CHANGE OF ACCESS AUTHORITY, COPY, DELETE |
| FOLDER CREATION | FOLDER CREATION, DOCUMENT REGISTRATION, CHANGE OF ACCESS AUTHORITY |
| ... | ... |

FIG.5

| MOVE | REGULAR MEETING PROCEEDING ○×PROJECT DOCUMENT, REVIEW RECORDING |
|---|---|
| PREVIEW | PRODUCT PLAN, WEEKLY REPORT, SITUATION OF PATENT APPLICATION, PROJECT PROGRESS TABLE |
| CHECK-OUT | SPECIFICATION INVESTIGATIVE COMMISSION MATERIAL, FUNCTION SPECIFICATION |
| ⋮ | ⋮ |

FIG.6

| | | |
|---|---|---|
| SPECIFICATION INVESTIGATIVE COMMISSION MATERIAL | CHECK-OUT, CHECK-IN, MOVE | |
| PROJECT PROGRESS TABLE | PREVIEW, CHANGE OF ACCESS AUTHORITY, DOWNLOAD, PRINT | |
| USER025 | GROUP REGISTRATION, PROPERTY DISPLAY | |
| ... | ... | ... |

FIG.7

| CHECK-OUT | CHECK-IN, DOWNLOAD |
| FOLDER CREATION | FOLDER CREATION, DOCUMENT REGISTRATION, CHANGE OF ACCESS AUTHORITY |
| USER CREATION | GROUP REGISTRATION, PROPERTY DISPLAY |
| ... | ... |

FIG.8

SETTING OF CHECK-IN

/../ DISTRIBUTED MATERIALS

DOCUMENT NAME: SPECIFICATION
INVESTIGATIVE COMMISSION MATERIAL
SELECTION OF DOCUMENT
TO BE UPLOADED                   [          ] [BROWSE]
VERSION COMMENT                  [                    ]

[EXECUTE]  [CANCEL]

FIG.14

| | USER REGISTRATION | NEWUSER | — | — | DEPARTMENT FOLDER |
|---|---|---|---|---|---|
| 20060901O923 | COPY | WEEKLY REPORT | — | DIVISION FOLDER | — |
| 20060831I830 | CHANGE OF ACCESS AUTHORITY | /../../PROCEEDING | — | — | — |
| 20060831I002 | CHECK-OUT | SPECIFICATION INVESTIGATIVE COMMISSION MATERIAL | /../DISTRIBUTED MATERIALS | — | — |
| 2006082814I0 | DOCUMENT REGISTRATION | ○× FUNCTION SPECIFICATION | /../SPECIFICATION | — | — |
| 200608271648S | ... | ... | ... | ... | ... |

FIG.21

| CHECK-OUT | 25 |
| --- | --- |
| GROUP CREATION | 0 |
| USER CREATION | 1 |
| DOCUMENT REGISTRATION | 44 |
| FOLDER CREATION | 12 |
| COPY | 8 |
| . . . | . . . |

| | PROPERTY DISPLAY | PREVIEW | COPY | CHECK-OUT | CHECK-IN | PRINT | ... |
|---|---|---|---|---|---|---|---|
| PROPERTY DISPLAY | 18 | 4 | 2 | 30 | 1 | 5 | ... |
| PREVIEW | 2 | 21 | 8 | 4 | 0 | 42 | ... |
| COPY | 0 | 2 | 26 | 1 | 0 | 24 | ... |
| CHECK-OUT | 10 | 8 | 0 | 0 | 35 | 16 | ... |
| CHECK-IN | 33 | 11 | 7 | 0 | 0 | 9 | ... |
| PRINT | 3 | 1 | 0 | 1 | 0 | 39 | ... |
| ... | ... | ... | ... | ... | ... | ... | ... |

DOCUMENT IMAGE MANAGEMENT DEVICE AND DOCUMENT IMAGE MANAGEMENT METHOD

BACKGROUND OF THE INVENTION

1. Field of the Invention

The present invention relates to a document image management device and a document image management method.

2. Description of the Related Art

Conventionally, there are document image management systems like the following.

One of them is a system by which a menu of lists for files recently used by a user is shown to the user, and as soon as the user selects a file therefrom, the file is opened so that the user can edit it. Although this technique is convenient when the same document is edited over and over again, this technique can only open a specified file, and there is an inconvenience that other operations cannot be executed on the file from the menu. In addition, some kind of functions cannot be associated with each file shown on the menu, and functions and files cannot be presented in pair.

There is a technique similar to this technique, by which, on a menu on which a list of functions is presented, functions are shown in order in which they are most frequently used by the user. However, this technique also cannot associate each file with each function.

The above techniques associated with a program on a computer, namely, OS and office application software are widely known, and in addition, the similar function is achieved on an image forming device, for example, a digital MFP (Multi-Function Peripheral) having functions of a copy machine, a printer and a facsimile.

Japanese Patent Laid-Open No. 10-254719 (1998) discloses an invention in which, when a user who wants to make a copy in an image forming device selects a copy function from its menu, the most frequently used sub functions related to copying are shown on the same position as that of a copy tab. That is to say, in a series of operations spanning multiple steps, such as, copying, faxing and print setting, the system determines by learning a candidate for the function to be executed next on the previously selected function, and shows it in priority. As just described, it is known that, when each main function has a hierarchical structure to allow finer sub functions to be executed, the next operations are presumed from the habit of the user operation, and shown in priority to improve operability. However, there is no technique of presenting those functions that are related, not among the functions that are in hierarchical relationship, but among those functions, each of which is a complete function.

There is completely different approach in which the histories of operations executed in the past by a user are accumulated, a list of histories is presented to the user so that the user selects any of histories from the list, and the same processing as that of the selected operation history is executed automatically. This is effective at repeating the exactly same operation as the operation executed in the past. However, changing a portion of the previous history, for example, when moving a document, changing the destination to a folder that is different from the previous one, or changing the document to be moved to a different document, etc., is not assumed. Merely, the same operation is executed strictly on the same target, and to the same operation source or destination. Thus, in practice, when the same operation as the previous operation was executed, the similar operation was repeated again.

As an example of using history information, in an invention disclosed in Japanese Patent Laid-Open No. 8-335010 (1996), an executed action is memorized as history information, together with the person, time, place, target or the like, associated with the execution. Then, a series of executed actions are associated and memorized as history information, allowing the history information to be exploited in devices other than the device on which the operation was executed. However, the invention disclosed in Japanese Patent Laid-Open No. 8-335010 (1996) focuses on centralizing and exploiting the operation history information that were managed separately on each image forming device in prior art. Therefore, the improvement in operability for a user who repeats the same operation is not taken account of, and processing such as determining the display order on the menu based on the previous operations by the user is not executed.

As described above, as an invention of improving its operability when a user often executes the same operation in a document image management system, there are prior arts like the following. First, there is a technique by which a list of documents used in the past by a user is shown to prompt the user to select a document from the list, and then the selected document is opened. In addition, there is a technique by which functions are reordered in order in which they are most frequently used by a user, or only functions that the user have used before are presented, and the functions that the user have not used are masked from the list before a function menu is shown. In addition, there is a technique by which operation history is presented to a user to allow the user to select any of histories, so that the same processing as that of the history that the user selected can be executed again.

SUMMARY OF THE INVENTION

However, these techniques have the following problems. First, concerning a technique by which a list of previously used documents is shown to prompt a user to select a document from the list, and then the selected document is opened, even if a document is selected from the shown menu, the document can only be opened, and operations other than editing cannot be executed.

Further, concerning a technique by which functions shown in a list on a function menu are masked or reordered in decreasing order of usage frequency, since usage frequency is considered on a function basis regardless of operation targets such as documents, rather it is difficult to use when a frequently used function is different for each document.

Furthermore, concerning a technique by which selection from operation histories is executed for re-execution, only the exactly same processing as that of the previous history can be executed, and the processing cannot be executed after a portion of an element the history has, for example, a document name and an operation destination is changed to different one from before. Therefore, this is effective only at repeating the exactly same operation every time, and, if a user wants to execute only slightly different operation, the user has to follow conventional procedure, which reduces operability.

To solve the above problems, a device according to the present invention, which has executing means for receiving selection of processing to be executed on a file or folder from an operator, and executing the processing, which selection is received, on the file or folder, comprises search means for searching for a file or folder on which the processing has been executed in the past in the executing means when receiving the selection of the processing from the operator, and operation target display means for showing on a display screen identification information on the file or folder searched for by the search means.

According to the present invention, when a user wants to execute the same operation as that executed in the past, the user can immediately move to a setting screen of a desired function by showing a menu from operation histories and selecting any of histories, thus allowing a less laborious method as compared with such procedure as in conventional art by which a document and a function are selected. Further, the subsequent operation can be predicted and presented in a workflow way according to operations executed in the past by a user. Therefore, operability and convenience of the user can be improved.

Further features of the present invention will become apparent from the following description of exemplary embodiments with reference to the attached drawings.

Further features of the present invention will become apparent from the following description of exemplary embodiments (with reference to the attached drawings).

BRIEF DESCRIPTION OF THE DRAWINGS

FIG. 5 is a diagram illustrating an example of a table of related functions memorized in related function memorization means;

FIG. 6 is a diagram illustrating an example of a table of operation targets on which, for each function memorized in operation target memorization means, the function has been executed;

FIG. 7 is a diagram illustrating an example of a table in which, for each user and for each operation target, functions executed on the operation target are memorized;

FIG. 8 is a diagram illustrating an example of a table in which, for each user and for each operation target, functions executed after the function was executed are memorized;

FIG. 14 is a diagram illustrating an example of a check-in setting dialog;

FIG. 19 is a diagram illustrating operation procedure by which a document is checked in;

FIG. 20 is a diagram illustrating operation procedure by which a document is checked in;

FIG. 21 is a diagram illustrating an example of operation histories memorized in operation history memorization means;

FIG. 24 is a diagram illustrating an example of a frequency of function used table in which the usage frequency for each function is memorized per user; and FIG. 25 is a diagram illustrating an example of a frequency with respect to previously used function table, in which the usage frequency of each function with respect to the function used previously is memorized per user.

DESCRIPTION OF THE EMBODIMENTS (Embodiment 1)

Figure 1:
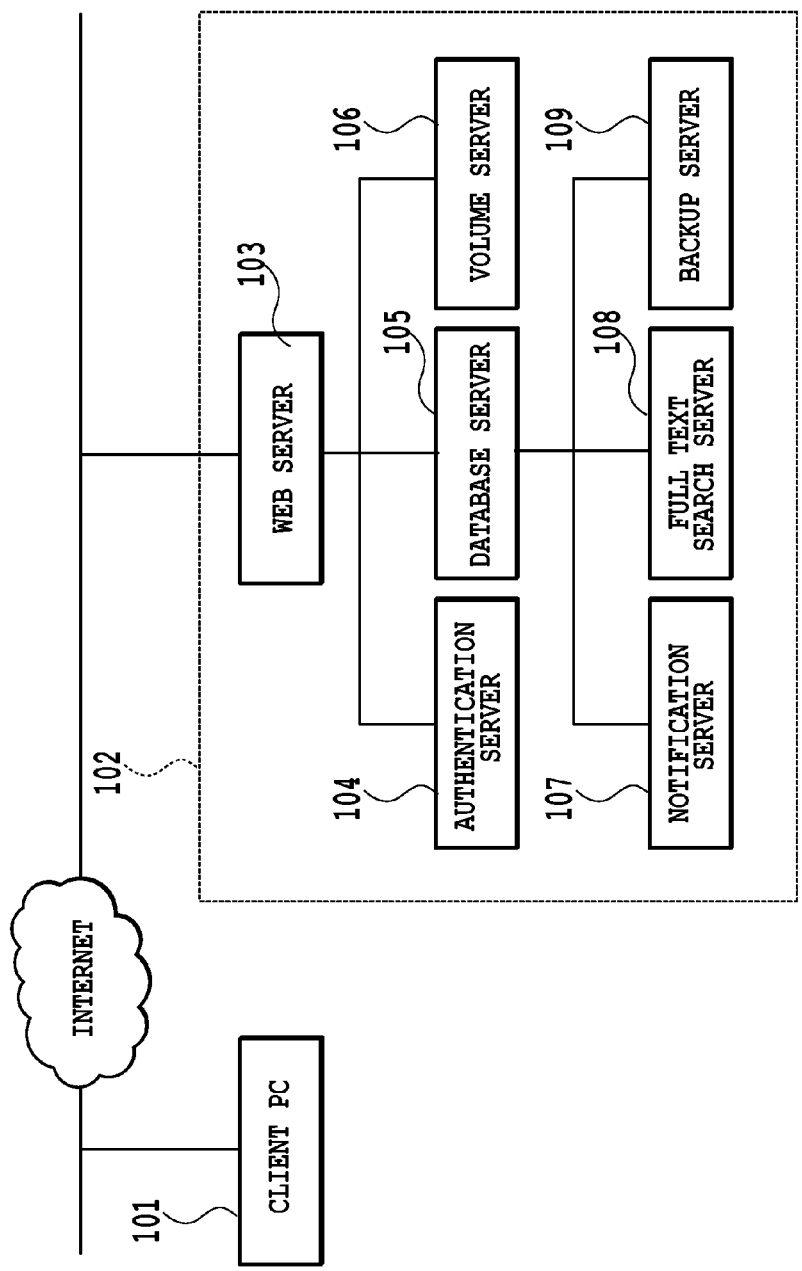
FIG. 1 is a diagram illustrating the overview of hardware of the present invention.

The best mode for carrying out the present invention will be described with reference to drawings. FIG. 1 is a diagram illustrating the overview of hardware according to an embodiment of the present invention.

A client PC 101 is connected to a document image management server 102 through the Internet, and a user uses the client PC 101 to activate a Web browser, connect to and log in a document image management server 102, and execute processing on the document image management server 102. For example, when the user logs in a general user screen, the user can transfer a document to the document image management server 102, and execute processing such as search and editing on a document stored in the document image management server 102. Further, when the user logs in an administrator screen, the user executes management of various resources managed on the document image management server 102, such as a document storage area, and maintenance of users and groups.

The document image management server 102 is a server for storing and managing documents transferred by a general user, and resources such as users, groups and indices created by an administrator user.

The document image management server 102 comprises each server described below.

The Web server 103 manages sessions linked with the client PC 101, makes a transmission to each of the following servers in response to a request, receives a processing result from each server and sends it back to the client PC 101.

An authentication server 104 analyzes login information on a user transferred from the client PC 101, and determines whether or not the user is a user registered with the server.

On a database server 105, a DBMS runs for managing documents and users.

A volume server 106 is a server for storing the substance of a document and its attribute information.

A notification server 107 is for sending a user notification mail such as the update of a document and the remaining amount of a disk.

A full text search server 108 is for creating and managing indices used for the full text search of documents. The full text search may be executed by full text search means 208 shown in FIG. 2. Further, a similarity search may be executed by similarity search means 209 shown in FIG. 2.

A backup server 109 is for saving the backup of the contents managed by the database server 105 and the volume server 106.

Figure 2:
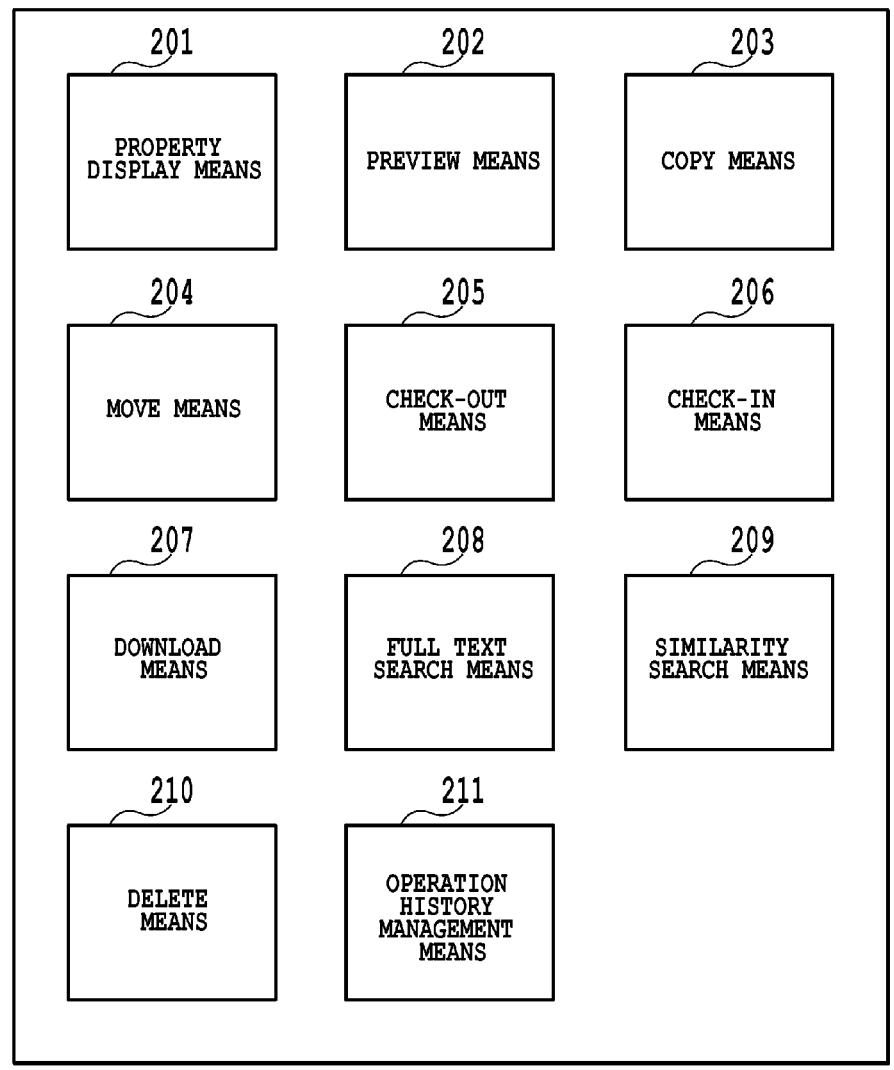
FIG. 2 is a diagram illustrating the overview of modules of the present invention.

FIG. 2 illustrates modules with which hardware (client PC 101 and document image management server 102) shown in FIG. 1 is provided.

A user who wants to refer to the attribute of a document, a folder, a user or the like uses property display means 201 to execute the function.

A user who wants to verify the contents of a document uses preview means 202 to activate a preview screen and show the contents of the selected document.

Copy means 203 is used to make a copy of documents and folders.

Move means 204 is used to move documents and folders below another folder.

A user who wants to update a document uses check-out means 205 to check out the document. This locks the document and prevents other users than this user from altering the document until this user checks in the document.

A user who checked out a document uses check-in means 206 to upload a new version of the document after editing, and unlock the checked out document so that other users can edit it.

Figure 3:
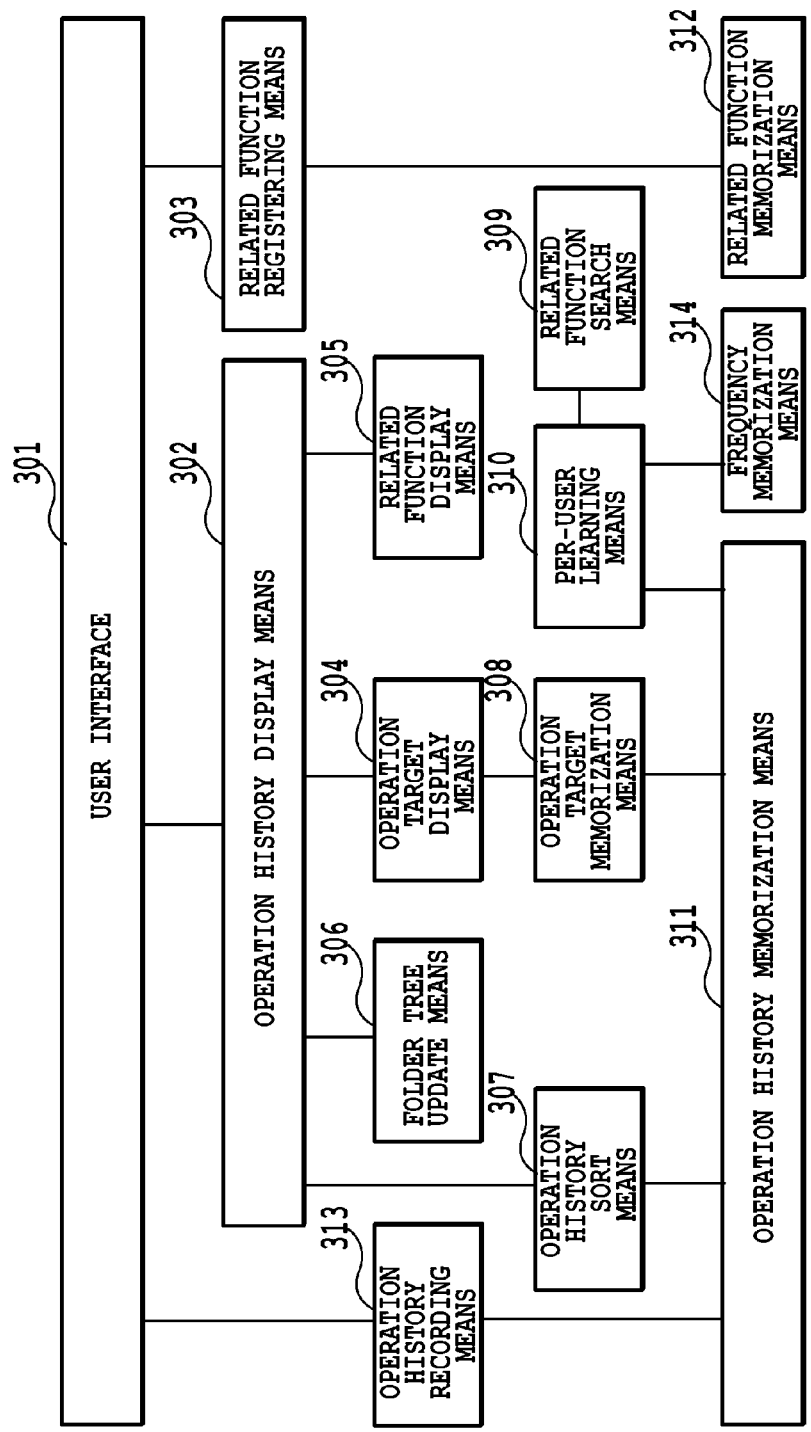
FIG. 3 is a diagram illustrating the overview of operation history management means according to the present invention.

FIG. 3 is a diagram illustrating means in details with which operation history management means 211 shown in FIG. 2 is provided.

A user interface 301 passes a signal entered by a user with a mouse or a keyboard to operation history display means 302 and related function registering means 303, which are described below. All the operations executed by the user are recorded in operation history memorization means 311, which is described below. Note that, in the present embodiment, information presented to the user is shown on a display screen the user interface is provided with.

FIG. 21 is a diagram illustrating an example of operation histories memorized in the operation history memorization means.

Figure 4:
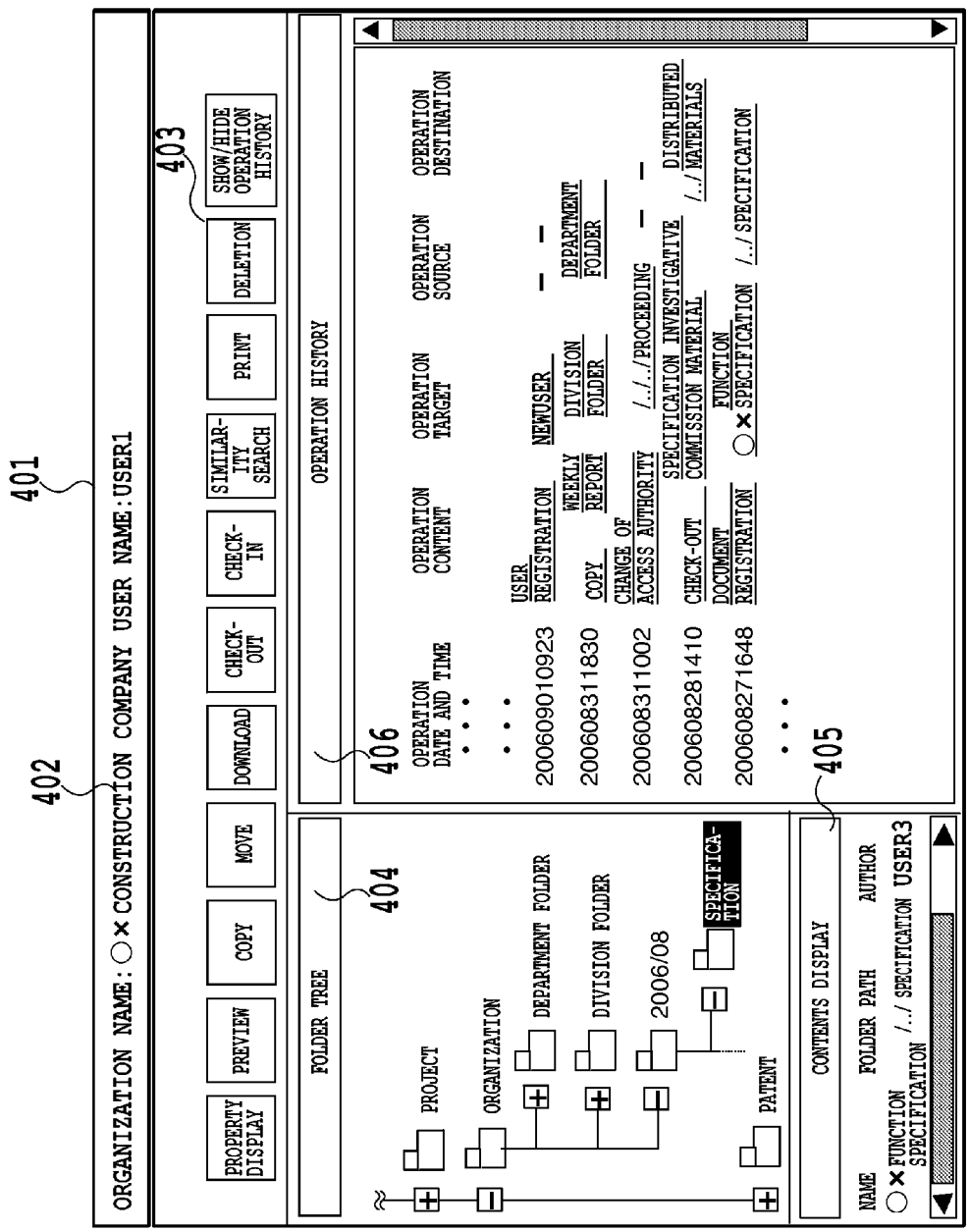
FIG. 4 is a diagram illustrating an example of the main screen of a document management system according to the present invention.

The operation history display means 302 shows a history list of operations executed in the past by a login user on the whole of the right pane on the contents display field of the main window of the client PC 101 in the document image management system. FIG. 4 shows an example of an operation history screen 401 shown by the operation history display means.

The name of an organization to which the user belongs and the name of the user are shown on a field 402. An actual operation is executed by pressing an operating button 403. In addition, a folder tree is shown on a field 404. In addition, a contents display is shown on a field 405. In addition, operation histories are shown on a field 406.

Each row corresponds to one operation, and each item is shown in order from left: operation date and time, operation content, operation target, operation source and operation destination.

The operation date and time is the date and time when the user executed the function, and, when it took one minute or longer for the operation to complete the processing, the date and time when the user started the operation, not the date and time when the user completed the operation, is recorded.

In the operation content, the name of a function executed by the user (namely, identification information on processing executed in the past on an operation target) is recorded.

In the operation target, the identification information on a target on which the function shown in the operation content was executed is recorded. For example, when an operation content is a user registration, the name of a registered user is recorded as an operation target. When an operation content is check-out, the name of a checked out document is recorded as an operation target.

The operation source and the operation destination are a start point and an end point in circumstances where a function shown in the operation content is executed. For example, when an operation content is the copy of a document, the copy source folder name of the document is recorded in the operation source, and the copy destination folder name is recorded in the operation destination, respectively. Note that an operation source or an operation destination may not exist depending on its operation content. For example, when an operation content is change of access authority, both of an operation source and an operation destination do not exist, and when an operation content is the check-out of a document, the operation source is a folder name in which the document is stored, but the operation destination is empty.

Figure 22:
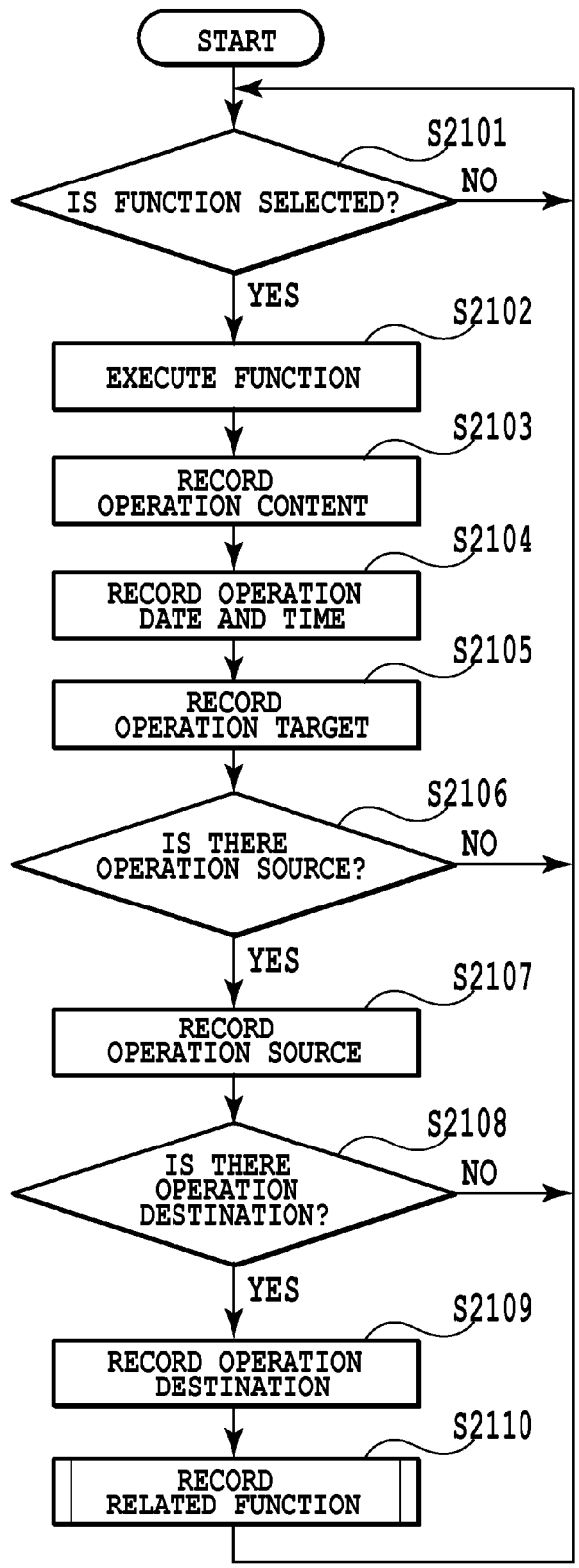
FIG. 22 is a diagram illustrating a flow of creating an operation history.

FIG. 22 is a diagram illustrating a flow of recording the history in the operation history memorization means 311 when a function is executed. All the steps shown in FIG. 22 are executed by a program executed on the CPU in the document image management system. The document image management device according to the present invention always monitors whether or not a user selected a function through the user interface 301 (step S2101). When detecting that the function to be executed on a file or folder was selected (in the present embodiment, selection of a function=instruction to execute a function=selection of processing=instruction to execute processing), the document image management device notifies means for executing the function of it. Then the means executes the function on the above file or folder (step S2102). For example, when a copy function is selected, the copy means 203 executes a copy function, and when a check-out function is selected, the check-out means 205 executes a check-out function. Upon finishing executing the function successfully, the means that executed the function notifies the operation history recording means 313 that the function was executed, and the operation history recording means 313 records the operation content in the operation history memorization means 311 (step S2103). According to the present embodiment, an operation content means a function selected by a user, and a file or folder on which the function was executed. In addition, in the present embodiment, an operation content is also referred to as a processing description.

Next, the operation history recording means 313 obtains the date and time when the function is received from the user interface 301, and records the operation date and time in the operation history memorization means 311 (step S2104). Then, the operation history recording means 313 obtains the operation target from the means for executing the function, and records the operation target in the operation history memorization means 311 (step S2105). Further, the operation history recording means 313 checks with the means for executing the function whether or not an operation source exists in executing the function. Then, when an operation source exists, the operation source is recorded in the operation history memorization means 311, on the other hand, when an operation source does not exist, this process moves to the next step (step S2106 to step S2107). In addition, the operation history recording means 313 checks with the means for executing the function whether or not an operation destination exists in executing the function, and when an operation destination exists, the operation destination is recorded in the operation history memorization means 311, on the other hand, when an operation destination does not exist, any processing is not executed (step S2108 to step S2109). Finally, a related function is recorded (step S2110) to complete all the processing on the function, control is returned to the user interface 301, and the process returns to a loop for receiving a function selected by a user.

The recording of a related function will be described below in details with reference to a flowchart of FIG. 23.

In FIG. 3, the related function registering means 303 is to be used by a user, in particular, a user who executes system administration, so that a function related to another function is associated with this function and registered. Although the relationship between functions is defined on a system basis, in general, those that should be executed in pair with a given function, namely, those that are executed in pair to complete processing, may be considered first. For example, usually, after a document is checked out, the same document is checked in, therefore, the related function of a check-out function is a check-in function.

In addition, as another relationship between functions, those that are more likely to be executed in continuation to a given function can be considered. For example, since, when a group is created, there is no member of the group at first, and users to belong to the group have to be registered, group creation and user registration with the group are related functions to each other.

In addition, since, when a user is created, processing to have the user belong to any of existing groups is usually executed, user creation and group registration are also related functions.

In addition, since, when a new document or folder is created, users and groups that can access the document or folder are registered, the creation of a document or folder and the grant of access authority are also related functions.

Figure 11:
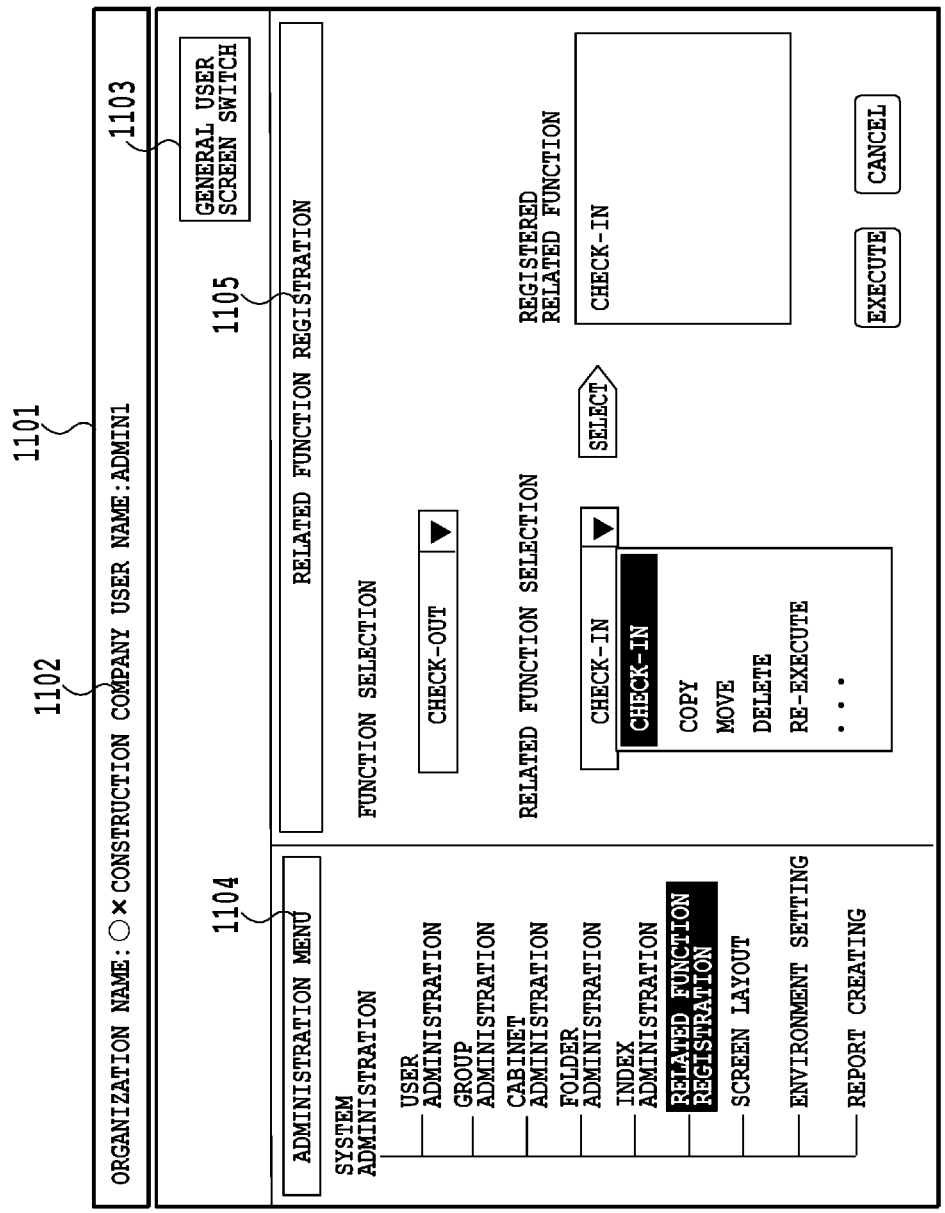
FIG. 11 is a diagram illustrating an example in which a related function is registered using an administrator screen.

FIG. 11 is a diagram illustrating an example of a related function registering screen shown by the related function registering means 303.

In the related function registering screen 1101, the name of an organization to which the user belongs, and the name of the user are shown on a field 1102. An actual operation is executed by pressing an operating button 1103. In addition, an administration menu is shown on a field 1104. Further, related functions are registered in a field 1105.

When an administrator account is used to log in the system, an administration menu is shown in a tree structure as shown in the left pane of FIG. 11.

User administration is for creating a new user, changing a property, importing a user from another system or exporting a user to another system.

Group administration is for executing the maintenance of groups, namely for generating a new group, and registering/deleting a member with/from an existing group. The deletion may be executed by delete means 210 shown in FIG. 2.

Cabinet administration is for adding a cabinet, and setting a mail notification function, which is set on a cabinet basis.

Folder administration is for changing the structure of a folder and setting an access authority to a folder.

Index administration is for executing the maintenance of a user index, which is granted when a general user creates a document or folder.

The registration of a related function will be described below in details with reference to a flowchart shown in FIG. 12.

A screen layout is for defining a screen layout which can be customized by a general user.

An environment setting is for setting an initial value, which defines the operating environment for a general user.

Creating of a report is for making an operation history report on a user basis or an operation target basis, or an administration report of a user or document.

Figure 12:
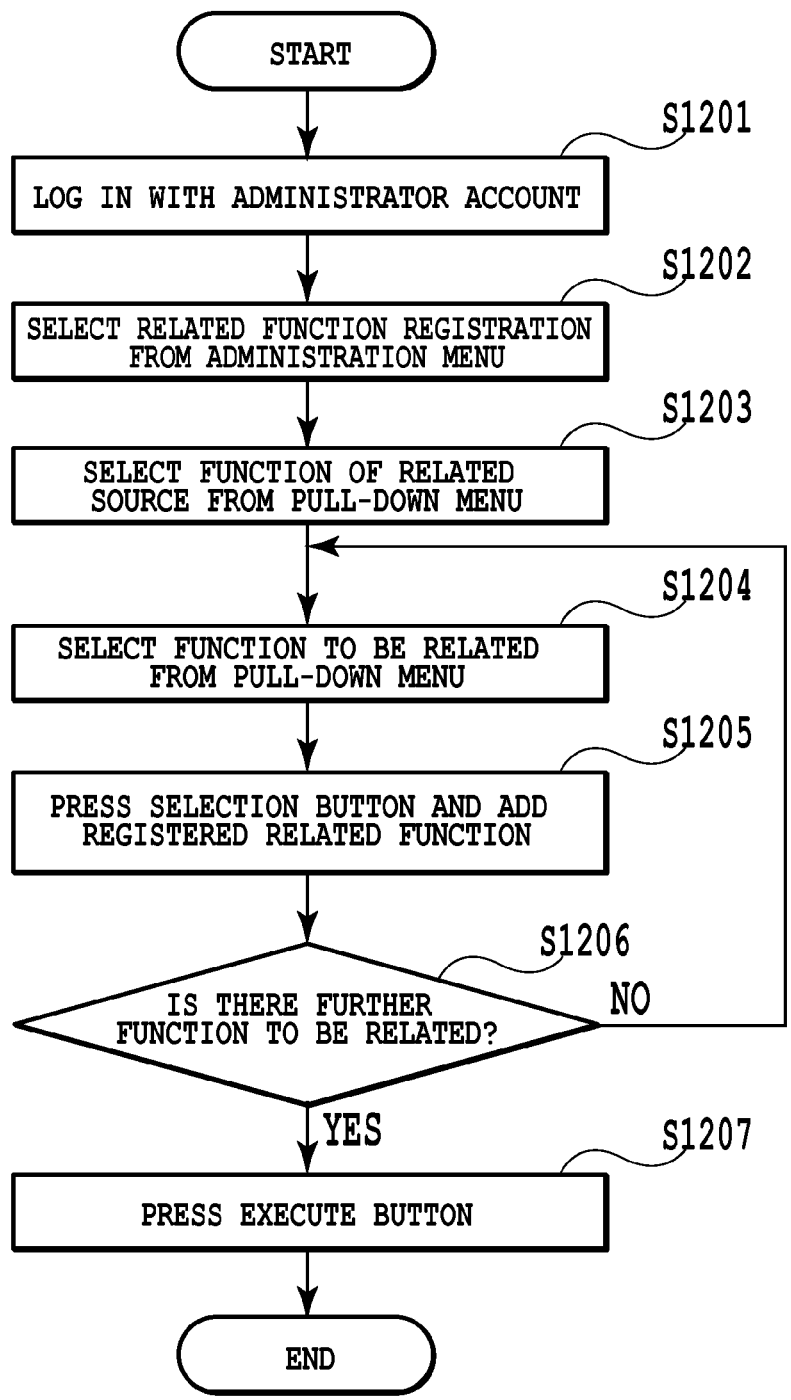
FIG. 12 is a flowchart illustrating the flow of an operation by which an administrator user registers the related function.

FIG. 12 is a diagram illustrating the flow of an operation by which an administrator user registers a related function. The operation flow shown in FIG. 12 will be described below. First, a program executed on the CPU in a document image management system according to the present invention receives login to the system with an administrator account (step S1201). Then, the administrator screen shown in FIG. 11 is shown by the program executed on the CPU in the document image management system according to the present invention.

When the program executed on the CPU in the document image management system according to the present invention receives the click of the related function registration in an administration menu (step S1202), the related function registering means 303 shows the related function registering screen on the right pane of the screen.

Two pull-down menus for a function selection and a related function selection are shown on the related function registering screen by the program executed on the CPU in the document image management system according to the present invention. First, the above administrator user selects, from the pull-down menu for the function selection, an original function to execute the association, and the system receives the selection (step S1203). Then, the administrator user selects, from the pull-down menu for the related function selection, a function to be associated with the function, which selection has been received, and the system receives the selection (step S1204). When any of functions is specified from the pull-down menu for the related function selection and a select button is pressed, the system receives the press and registers the function as a registered related function (step S1205).

Therefore, when a user desires to specify two or more functions to be associated, this operation is repeated to register the two or more functions with the registered related function (step S1206). Finally, when the program executed on the CPU in the document image management system according to the present invention receives the press of a execute button, all the functions specified by the registered related function with respect to the function specified in the function selection are registered as related functions (step S1207).

In an example shown in FIG. 11, only a check-in function is registered as a related function with respect to a check-out function.

In FIG. 3, operation target display means 304 is for listing, in a pup-up menu format, all the operation targets on which an operation content clicked by a user in operation histories shown by the operation history display means 302 is executed.

Related function display means 305 is for listing, in a pop-up menu format, a related function searched for by related function search means 309.

Folder tree update means 306 rewrite a folder tree screen in a contents display area of the main window in order to show the folder of an operation source or operation destination clicked by a user in the operation histories shown by the operation history display means 302.

Operation history sort means 307 reorders the operation histories memorized in the operation history memorization means 311 based on a sort method specified by the user when the operation history display means 302 shows the operation histories.

Operation target memorization means 308, with respect to each function recorded in the operation histories as an operation content, sequentially records identification information of all the operation targets on which this function has been executed in the past.

The related function search means 309 searches the related functions memorized in the related function memorization means 312 for a function related to the function executed on an operation target clicked by the user in the operation histories shown by the operation history display means 302.

Per-user learning means 310 counts the usage frequency of each function per user, and for functions executed in continuation after a given function has been used, the usage frequency per function. Then, the per-user learning means 310 notifies the related function search means 309 of the frequencies, when the related function search means 309 determines the priorities of the related functions based on the information memorized in the related function memorization means 312.

The operation history memorization means 311 records, for each user, the information on date and time (YYYYM-MDDhhmm) when the function was executed, an operation content, an operation target, an operation source and an operation destination, for all the functions executed by a user through the user interface 301.

The related function memorization means 312 memorizes the related functions registered by a user through the related function registering means 303.

After the function specified by the user through the user interface is executed, the operation history recording means 313 records the history of the executed function in the operation history memorization means 311.

Frequency memorization means 314 has two tables: a frequency of function used table, which counts and memorizes the usage frequency of each function per user, and a frequency per immediately preceding function table, which counts and memorizes the usage frequency of each function per user, for each function that the user used immediately before.

FIG. 24 shows an example of the frequency of function used table, which records the number of times a user used each function that the document image management device of the present invention has. In this example, the fact that 25 check-outs were executed and that group creation has not been executed even once, and like, are recorded.

FIG. 25 shows an example of a frequency per immediately preceding function table, in which the number of times a user used a function is recorded per function used immediately before by the user. The first row of FIG. 25 shows a list of functions used by the user, and the functions used by the same user immediately before the functions were used, are arranged in the first column.

That is to say, any of the items 2401 shows the name of a function executed this time, and any of the items 2402 shows the name of a function executed by the same user the previous time. The value where each row and each column intersect is the frequency of performance of the function, and indicates the number of times the function of S2402 was executed the previous time.

For example, among the number of times a check-in was executed, the number of times where property display was executed immediately before that is one. And, it can be seen that the number of times where a check-out was executed immediately before that is 35, and that the number of times where a check-in was executed immediately before that, namely, where two check-ins were executed in succession, is zero.

Note that FIG. 25 represents each item in a table format for purposes of illustration; there is no column for each item name within the device of the present invention, and each item is coded and stored in database.

Update of the frequency of function used table and the frequency per immediately preceding function table will be described with reference to FIG. 23.

Figure 23:
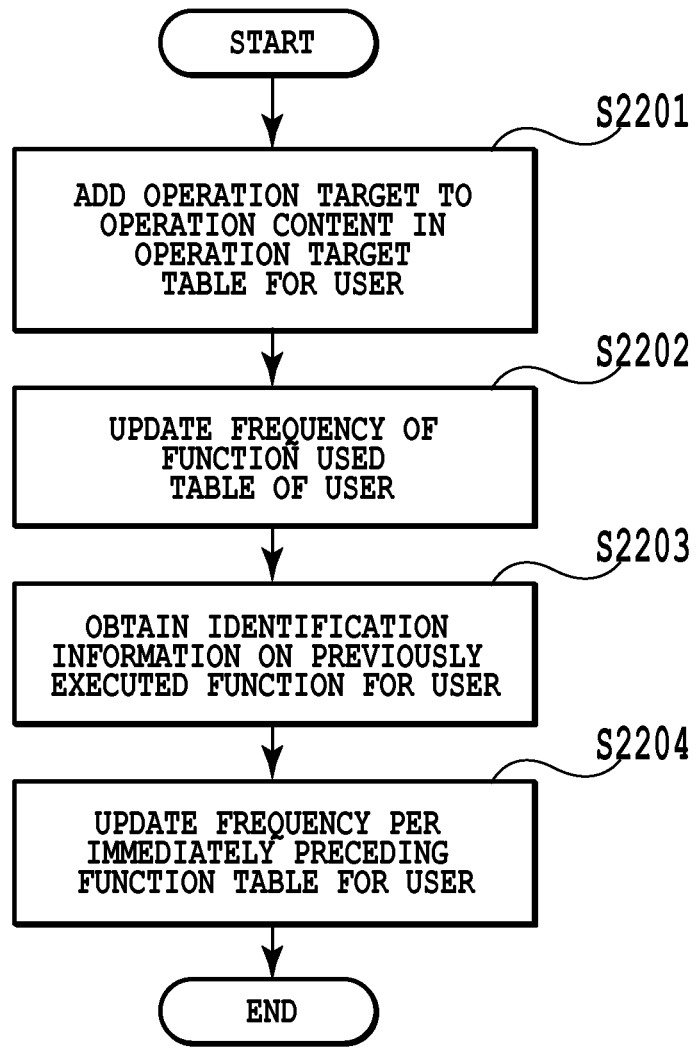
FIG. 23 is a diagram illustrating a flow of recording a related function.

FIG. 23 is a flowchart showing the details of recording of the related functions shown in step S2110 of the flowchart of FIG. 22. All the steps shown in FIG. 23 are executed by a program executed on the CPU in the document image management system.

First, as the operation content in an operation target table which the system keeps with respect to a user who executed a function in FIG. 22, an operation target on which the function was executed is recorded. The operation target table is for recording the target on which the function is executed in the operation target memorization means 308 every time a function is executed, as shown in FIG. 6 (step S2201).

Next, a usage frequency table kept by the system with respect to the user who executed the function is updated. That is to say, in the usage frequency table for the user as shown in FIG. 24, the value of the number of performance for the function executed this time is increased by one (step S2202).

Next, the identification information on a function executed immediately before the user executed a function this time, or when the user executed a function the previous time is obtained (step S2203). To that end, the per-user learning means 310 refers to the operation histories recorded in the operation history memorization means 311. That is to say, in operation histories, a history is searched for, having the most recent operation date and time, among those in which the operator is the user, and the operation content is obtained from the history.

Finally, the frequency per immediately preceding function table kept by the system with respect the user who executed the function is updated. That is to say, in the frequency per immediately preceding function table for the user, such as shown in FIG. 25, the value corresponding to a case where the function is equal to the function executed this time by the user and where the previously executed function is equal to the function obtained in step S2203, is increased by one (step S2204).

Figure 9:
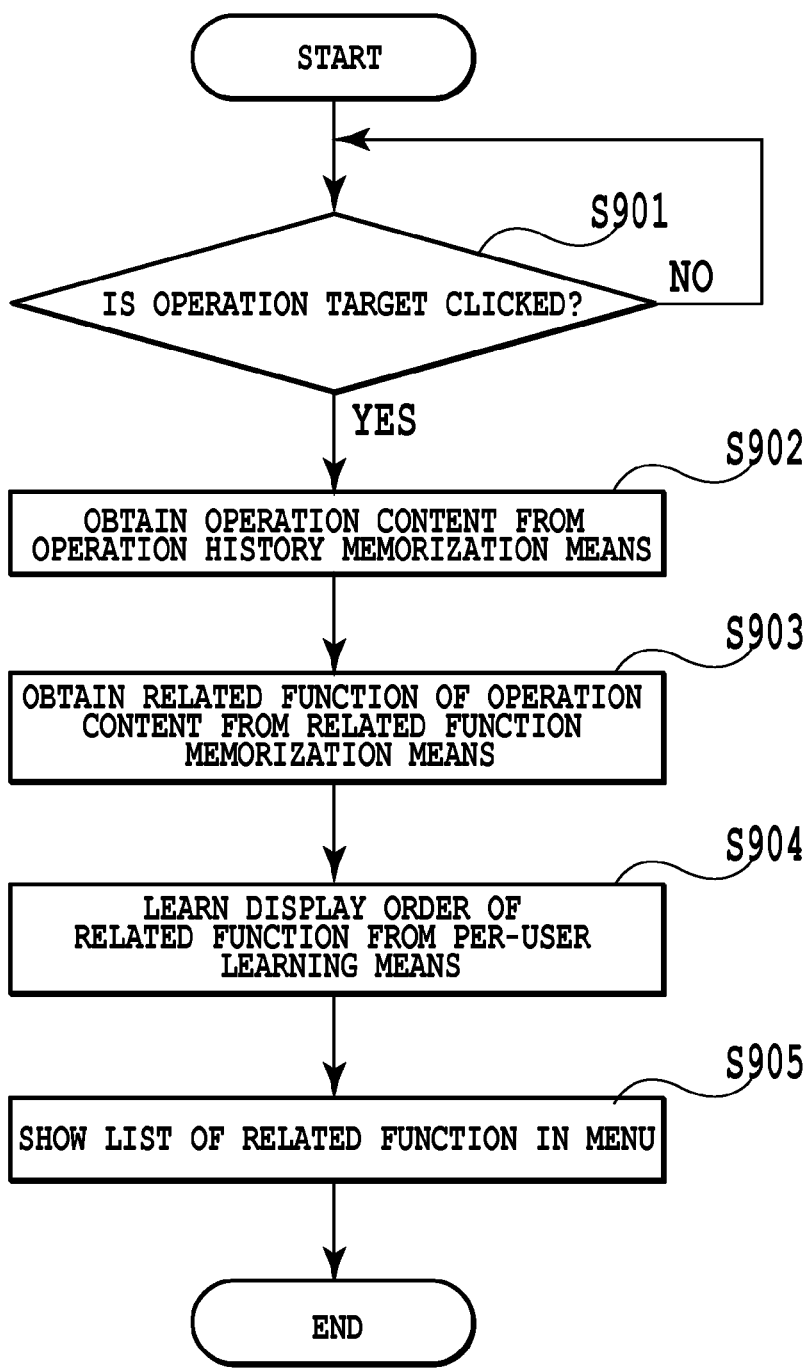
FIG. 9 is a flowchart illustrating the action of a system when an operation target is clicked in operation histories.

Next, the action of the system when a user clicks a hyperlink of an operation target included in a history in the operation histories shown on the operation history screen will be described with reference to a flowchart shown in FIG. 9. All the steps shown in FIG. 9 are executed by a program executed on the CPU in the document image management system.

The operation history display means 302 always monitors whether or not a link indicating an operation target in the list of the operation histories is clicked by a user (step S901). Then, upon detecting that the link indicating the operation target included in a history is clicked, the operation history display means obtains the operation content executed on the clicked operation target in the histories memorized in the operation history memorization means 311 (step S902).

Then, the related function search means 309 searches the related function memorization means 312 for the related functions to the function corresponding to the operation content obtained in step S902, and obtains the list of the related functions (step S903).

FIG. 5 is a diagram illustrating an example of a table of related functions memorized in related function memorization means 312. As already described in FIGS. 11 and 12, the administrator user can register any number of thereto related functions with respect to each function. The related functions registered therewith are memorized in the related function memorization means 312 in a format shown in FIG. 5. Note that, although, for purposes of illustration, in FIG. 5, a string is used to represent a function name in a table format, on an actual system, all the functions are translated into corresponding codes and memorized.

In an example in FIG. 5, check-in is registered in the first row as a related function to a check-out function. A user registration function is registered in the second row as a related function to a group creation function. A group registration function is registered in the third row as a related function to a user creation function. Three functions: change of access authority, copy, delete are registered in the fourth row as related functions to a document registration function. In addition, three functions: folder creation, document registration, change of access authority are registered in the fifth row as related functions to a folder creation function.

Returning to FIG. 9, the related function search means 309 then make an inquiry to the per-user learning means 310 in order to determine the order of display of the related functions obtained in step S903. The per-user learning means 310 counts the usage frequency of each function per user, and for functions executed in continuation after a given function has been used, the usage frequency per function. Therefore, the related function search means 309 determines the display priority of the related functions based on information on the related functions memorized in the related function memorization means 312, and the usage frequencies thereof.

Then the related function display means 305 shows a list thereof in a menu (step S905) according to the display order of the related functions determined in step S904.

Then, the processing shown in FIG. 9 finishes.

Figure 13:
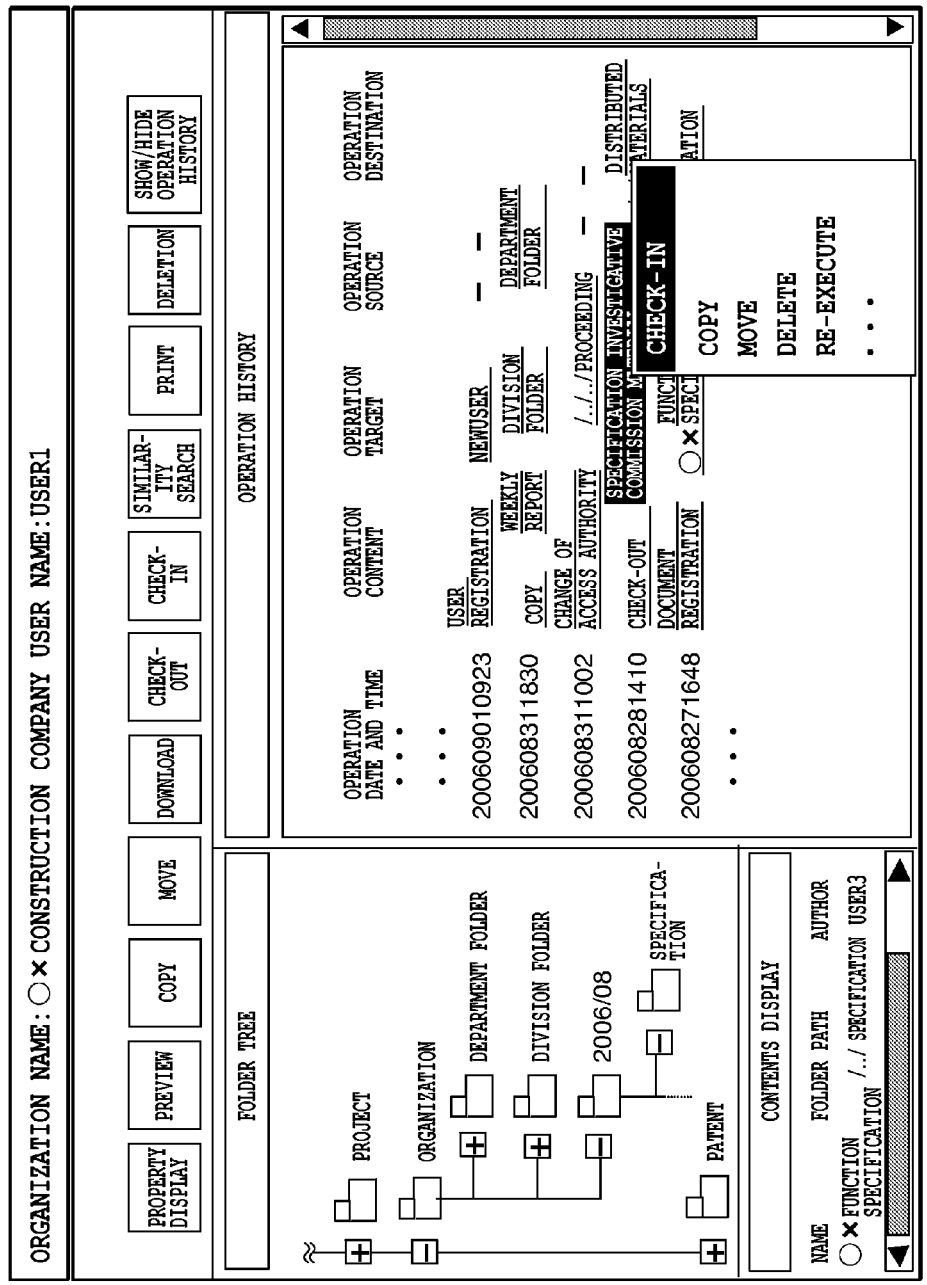
FIG. 13 is a diagram illustrating a pup-up menu shown by related function display means when a document name is clicked in a check-out history on an operation history screen.

FIG. 13 is a diagram illustrating an example of a pop-up menu of related functions shown by the related function display means 305. In this example, a case is described where a user clicked an operation target in the history of the check-out operation executed on Aug. 28, 2006, at 14:10 from the list of the operation histories. It is assumed that as the related functions of the check-out function, an administrator user registered in advance with the related function memorization means 312 through the related function registering means 303, each function of check-in, check-out, delete, move and copy.

When a document "specification investigative commission material", which is an operation target in the history, is clicked, the related function search means 309 searches the related function memorization means 312 for the function registered as a function related to check-out, which is an operation content in the history. Note that, in this embodiment, each function, such as check-in, check-out, delete, move and copy, is registered by the administrator user as a function related to the check-out (see FIG. 13). Therefore, in this embodiment, the identification information on these functions would be obtained by the above search.

In addition, the related function search means 309 makes an inquiry to the per-user learning means 310 about information on the usage frequency by the user of these related function (function registered as related function). As a result, a list of functions is shown with a pop-up menu in order in which the user used these related functions most frequently. In this example, the functions are sorted and shown in order in which the user used the functions most frequently, for example, check-in, copy, move, delete, check-out.

In addition, in this example, the functions are sorted based on the frequency with which the user used the related functions in the previous operations. However, as another embodiment, a method of implementation can also be considered, whereby, for each related function, the number of times executed immediately after check-out, which is the operation content, is summed over all the users on the system without limiting to the user, and the related functions are arranged and shown in decreasing order of this value. Therefore, the administrator may add a menu to the system administration on the administrator screen so as to switch therebetween.

Then, when the user selects check-in, for example, from the pop-up menu on which the related functions are shown, a check-in setting dialog as shown in FIG. 14 opens, and the user can start the check-in operation on the document on the screen immediately.

In the history of the check-out selected in FIG. 13, since the document, which is an operation target, is specification investigative commission material, the dialog is activated with the specification investigative commission material, which is an operation target on the check-in screen, being set as the document name. As described above, the user need only select a document to be uploaded to the document image management server and enter a comment attached to its version up, as necessary, to finish the check-in operation.

Figure 19:
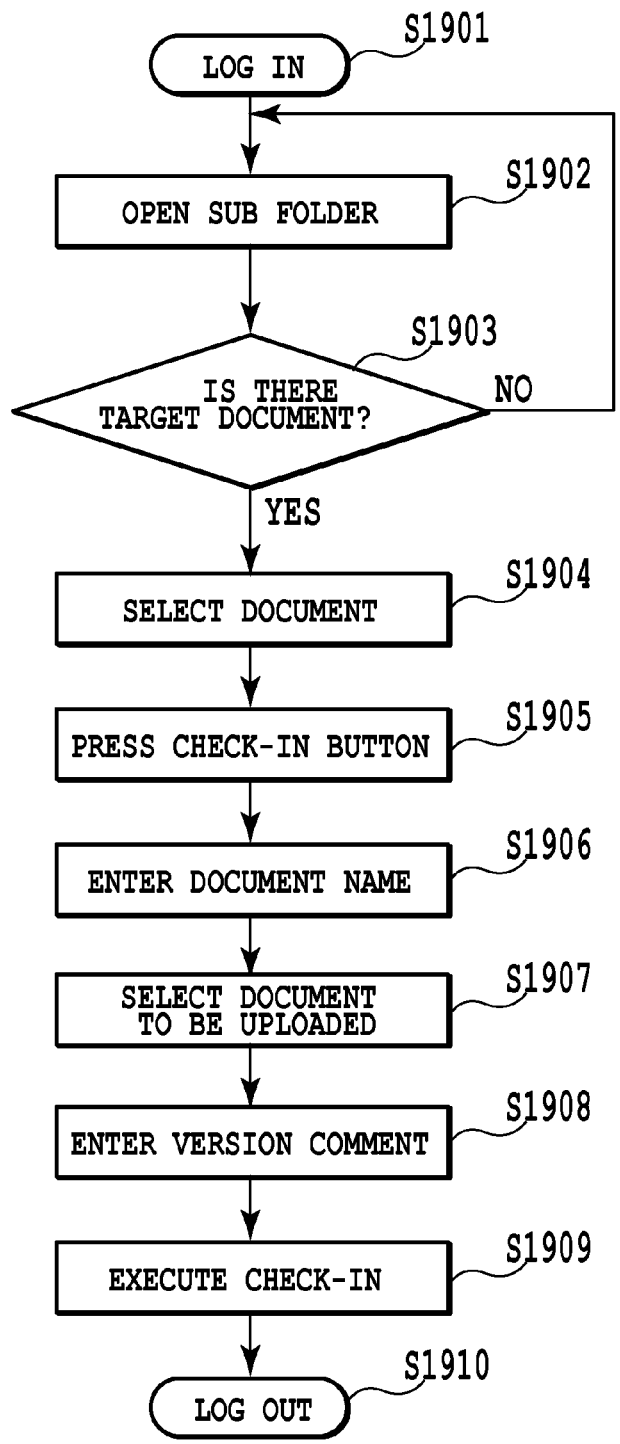
Figure 20:
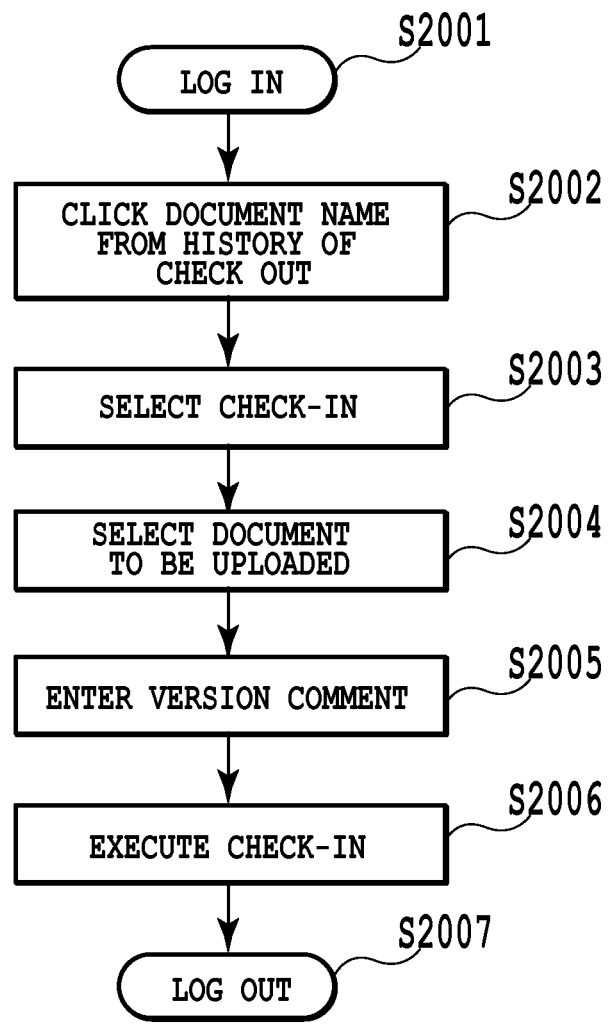

FIGS. 19 and 20 show a comparison between an operation flow of executing check-in using the present invention described above, and an operation flow of executing check-in using the operation procedure of a conventional invention.

FIG. 19 is the operation procedure of a general check-in in a conventional document image management system. In addition, FIG. 20 is the operation procedure of executing check-in by selecting it from the operation history according to the present invention. By comparison of them, it can be seen that the procedure of the present invention contributes to the reduction in load of the operation by the user.

The concrete contents of the flowchart shown in FIG. 19 are as follows. First, in step S1901, the program executed on the CPU in the document image management system according to the present invention receives the login of a user. Then, in step S1902, the program executed on the CPU in the document image management system according to the present invention opens a sub folder. In step S1903, the program executed on the CPU in the document image management system according to the present invention determines whether there is a target document. When there is no target document, this process returns to step S1902. On the other hand, there is a target document, the process goes to step S1904. Then, in step S1904, the program executed on the CPU in the document image management system according to the present invention receives the selection of a document. Then, in step S1905, the program executed on the CPU in the document image management system according to the present invention receives the press of a check-in button. Then, in step S1906, the program executed on the CPU in the document image management system according to the present invention receives the input of a document name. Then, in step S1907, the program executed on the CPU in the document image management system according to the present invention receives the selection of a document to be uploaded. Then, in step S1908, the program executed on the CPU in the document image management system according to the present invention receives the input of a version comment. Then, in step S1909, the program executed on the CPU in the document image management system according to the present invention executes check-in. Finally, in step S1910, the program executed on the CPU in the document image management system according to the present invention receives the logout of the user.

The concrete contents of the flowchart shown in FIG. 20 are as follows. First, in step S2001, the program executed on the CPU in the document image management system according to the present invention receives the login of a user. Then, in step S2002, the program executed on the CPU in the document image management system according to the present invention receives the click of a document name from the check-out history. Then, in step S2003, the program executed on the CPU in the document image management system according to the present invention receives the selection of check-in. Then, in step S2004, the program executed on the CPU in the document image management system according to the present invention receives the selection of a document to be uploaded. Then, in step S2005, the program executed on the CPU in the document image management system according to the present invention receives the input of a version comment. Then, in step S2006, the program executed on the CPU in the document image management system according to the present invention executes check-in. Finally, in step S2007, the program executed on the CPU in the document image management system according to the present invention receives the logout of the user.

Figure 10:
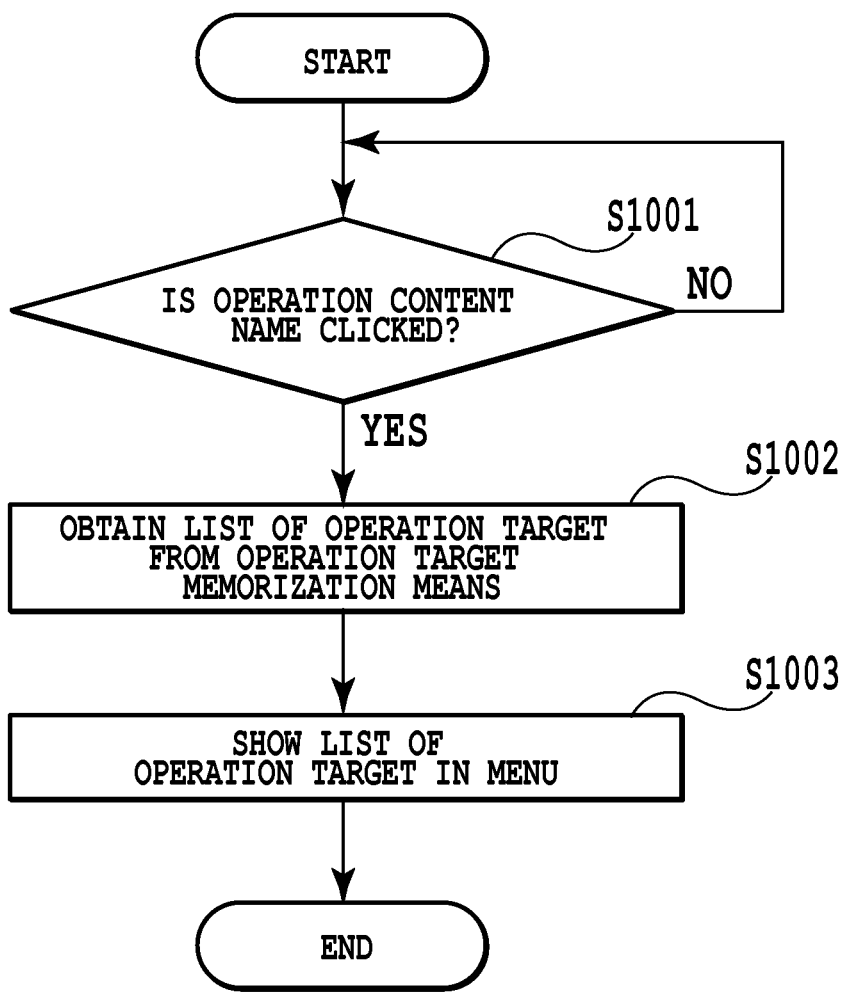
FIG. 10 is a flowchart illustrating the action of a system when an operation content is clicked in operation histories.

Next, the action of the system when a user clicks a hyperlink of an operation content included in a history in the operation histories shown on the operation history screen will be described with reference to a flowchart of FIG. 10. All the steps shown in FIG. 10 are executed by a program executed on the CPU in the document image management system.

The operation history display means 302 always monitors whether or not a link (identification information indicating processing) indicating an operation content (type of processing) in the list of the operation histories is clicked by a user (step S1001). Then, the selection of the link indicating the operation content (type of processing) included in a history is received. Subsequently, the operation target display means searches the histories memorized in the operation target memorization means 308 for operation targets, on which were executed from the operator instructions with the same operation content (type of processing) as an operation content (type of processing) which selection was received. Then, the operation target display means obtains the list of the identification information on the operation target obtained by this search (step S1002).

Note that "list of operation targets, on which were executed from the operator instructions with the same operation content as an operation content which selection was received", therefore, corresponds to "list of operation targets, on which was executed in the past the same processing as processing to be executed by an operation content which selection was received." Here, "an operation content which selection was received" means the type of processing, and "the same operation content" also means the type of processing.

The reason is, in the document image management system according to the present embodiment, every time an operation content is selected, processing corresponding to the selection of the operation content is executed. FIG. 6 is a diagram illustrating an example of a list of operation targets on which, for each function memorized in the operation target memorization means 308, the function has been executed. This list, with respect to each function recorded in the operation histories as an operation content, sequentially records identification information of all the operation targets on which this function has been executed in the past. In the example shown in FIG. 6, in the first row, move is recorded as an operation content, and three documents: "regular meeting proceeding", "○× project document" and "review recording" are recorded as operation targets on which move was executed in the past. In addition, in the second row, a preview function is recorded as an operation content, and four documents: "product plan", "weekly report", "situation of patent application" and "project progress table" are recorded as operation targets on which preview was executed in the past.

Note that, in FIG. 6 as with FIG. 5, natural language is used for purposes of illustration, however, on the actual system, functions and operation targets are translated into corresponding codes and memorized.

In addition, FIG. 7 is a diagram illustrating an example of a list in which, for each user and for each operation target, functions executed on the operation target are memorized. FIG. 8 is a diagram illustrating an example of a list in which, for each user and for each operation target, functions executed after the function was executed are memorized.

Returning to FIG. 10, the operation target display means 304 shows in a menu the list of the identification information on the operation targets obtained in step S1002 on the user interface 301 (step S1003), and the processing finishes.

Figure 15:
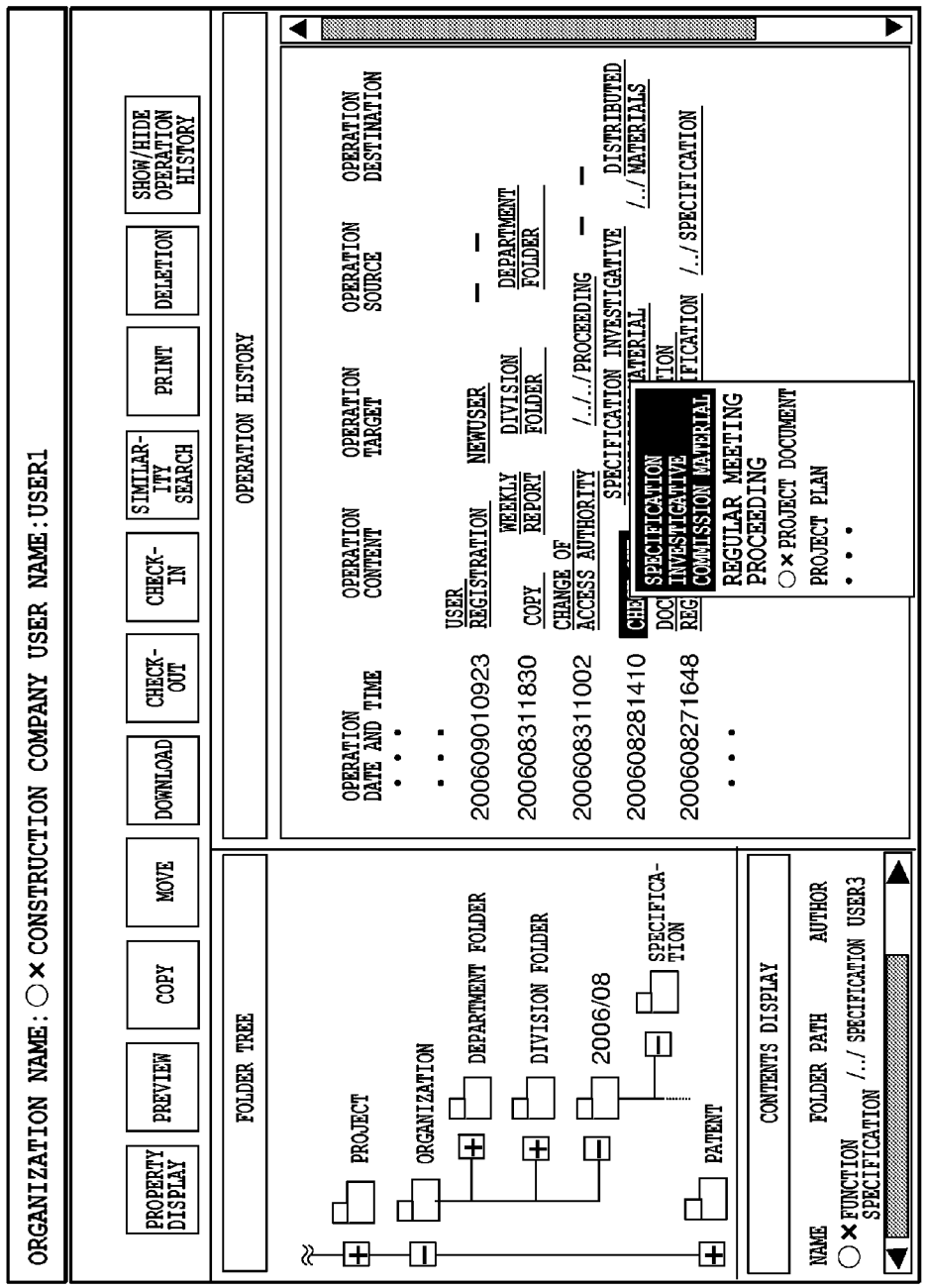
FIG. 15 is a diagram illustrating a pup-up menu shown by operation target display means when an operation content name is clicked on the operation history screen.

FIG. 15 is a diagram illustrating an example of a pop-up menu of a list of operation targets shown by the operation target display means 304. In this example, a case is described where a user clicked an operation content in the history of the check-out operation executed on Aug. 28, 2006, at 14:10 from the list of the operation histories.

When the operation content of check-out is clicked, the operation target display means 304 obtains, from the operation target memorization means 308, the lists of identification information on targets on which check-out, which is the operation content of the history, has been executed in the past by the user. Then the operation target display means 304 reorders the lists thereof in order in which they were most recently executed, which it shows on a pop-up menu. In this example, as operation targets that the user checked out most recently, the operation targets are sorted and shown in order of specification investigative commission material, regular meeting proceeding, ○× project document and project plan.

Note that, in the present embodiment, as described above, the operation targets on which the selected processing was executed recently are shown in a list in order in which the selected processing was executed most recently. However, as another embodiment, the following may be considered. That is to say, when check-out, the operation content arranged (located) next to specification investigative commission material, is clicked, only the operation targets checked out before the specification investigative commission material may be shown in the list. That is to say, when the operation content is clicked, only the operation targets checked out before the target (file or folder) indicated by the identification information arranged next to the operation content may be shown in the list.

Alternatively, only the above previously checked out operation targets, and the target indicated by the identification information arranged next to the above operation content (specification investigative commission material in the above example) may be shown in the list. The reason is, in the operation history information in FIGS. 13 and 15, files and folders arranged above from the specification investigative commission material being older, there is a high probability that they were skipped as not being necessary to the user.

Alternatively, or additionally, as another embodiment, the following may be considered. That is to say, when check-out, the operation content arranged (located) next to specification investigative commission material, is clicked, only the operation targets checked out around the same time as the specification investigative commission material may be shown in the list. That is to say, when the operation content is clicked, only the operation targets checked out near the target (file or folder) indicated by the identification information arranged next to the operation content may be shown in the list.

Alternatively, only the operation targets near the above target, and the targets indicated by identification information arranged next to the above operation content (specification investigative commission material in the above example) may be shown in the list. The reason is, the fact that the check-out next to the specification investigative commission material has been clicked means that there is a high possibility that the user is searching for a file or folder on which check-out was executed around the same time as the specification investigative commission material. Note that the possibility is higher when the user is searching for a desired file or folder based on the type of processing (for example, operation target) and a date.

Note that, in the present embodiment, the term of "near" means the following. That is to say, "near" means a predetermined duration (for example, one hour) between before and after a predetermined data and time earlier (for example, one day earlier) than the date and time (08/28 14:10) when the specification investigative commission material was checked out. That is to say, since "near" has the above meaning, for example, in the present embodiment, files and folders checked out between 08/27 13:10 to 08/27 15:10 near 08/28 14:10 would be shown in the list. Alternatively, this "near" may mean a predetermined number (for example three) before and after the specification investigative commission material was checked out. In this case, six files or folders from three files or folders checked out earlier than the specification investigative commission material, to three files or folders checked out later than the specification investigative commission material, would be the near operation targets.

Then, when the user selects a project plan among them, for example, a check-out setting dialog opens, and the user can start executing the check out operation of the document immediately. In this manner, a check-out operation in which, with respect to the previous operation history, the operation target has been changed from specification investigative commission material to project plan, can be executed via a simple procedure. This reduces the load on a user as compared with a case where the project plan, which is the target document, is searched for at first, and the check-out function is executed on it.

Figure 16:
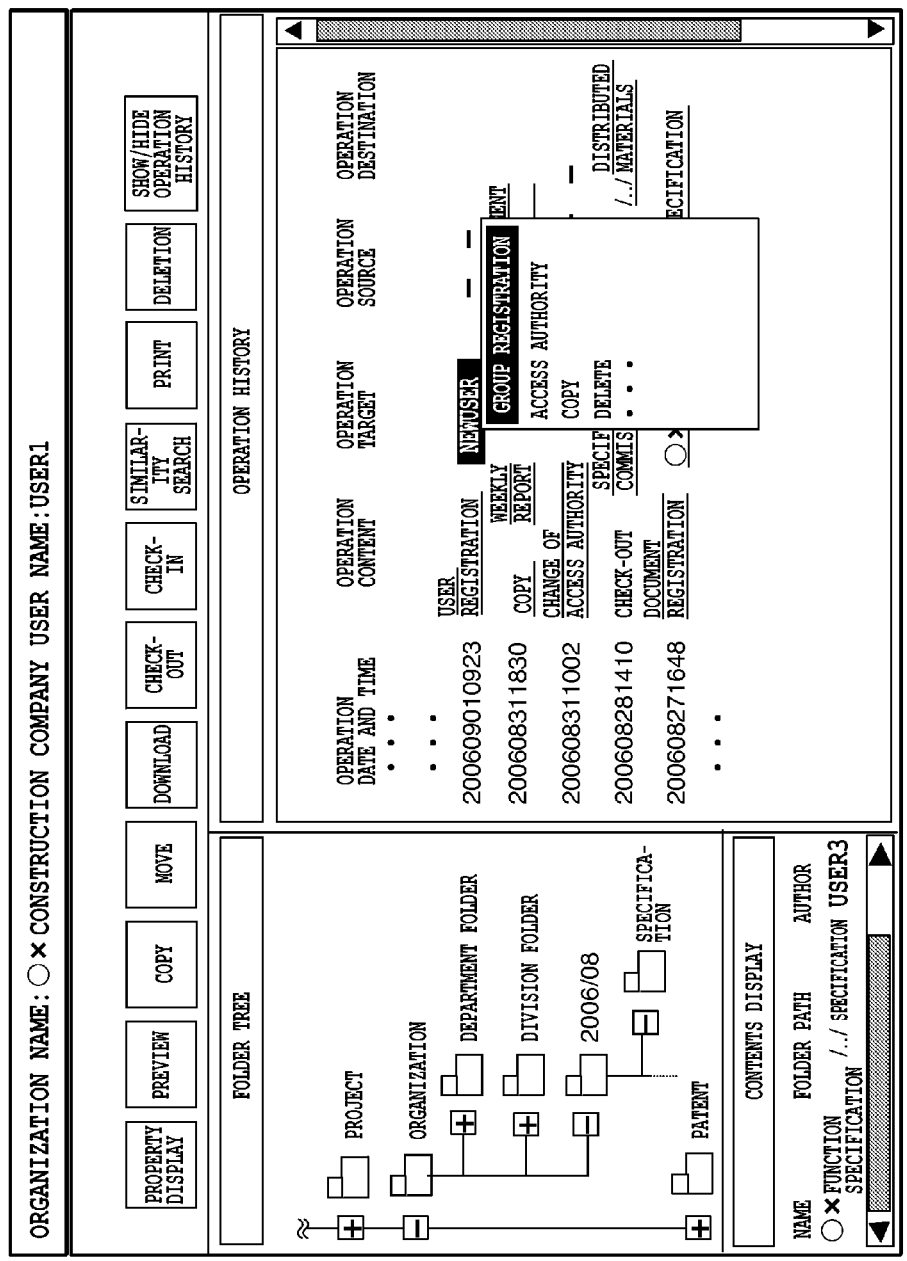
FIG. 16 is a diagram illustrating a pup-up menu shown by the related function display means when a user name is clicked on the operation history screen.

FIG. 16 is an example in which the menu of related functions is shown by clicking the operation target when the operation target is a user. A case where newuser is clicked, which is the operation target of user registration executed on Sep. 10, 2006, at 9:23, will be described herein. When newuser is clicked, the related function display means 305 passes the related function of the user registration, which is the operation content of the newuser, to the related function search means 309. The related function search means 309 obtains the list of the functions registered as the related function of the user registration from the related function memorization means 312. As a result, assuming that each function of copy, delete, group registration and change of access authority is obtained, the related function search means 309 then obtains each usage frequency of these related functions by the user from the per-user learning means 310. Then the related functions are reordered in decreasing order of frequency and shown in a menu. In this example, the order is group registration, change of access authority, copy and delete in decreasing order of frequency (the number of times of use). By selecting any of functions from the menu, the user can move to a setting screen where the function is executed.

Figure 17:
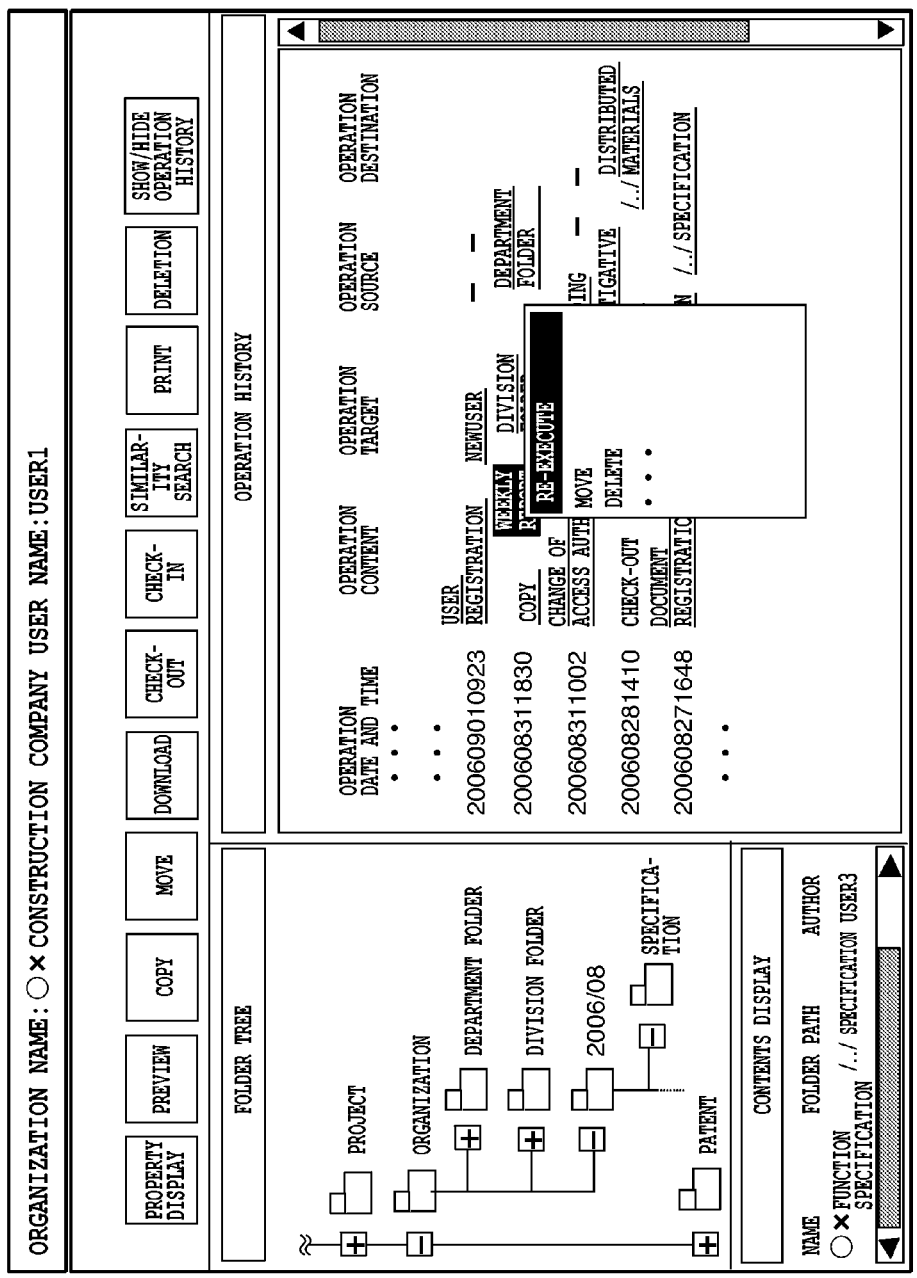
FIG. 17 is a diagram illustrating a pup-up menu shown by the related function display means when a document name is clicked in a copy history on the operation history screen.
Figure 18:
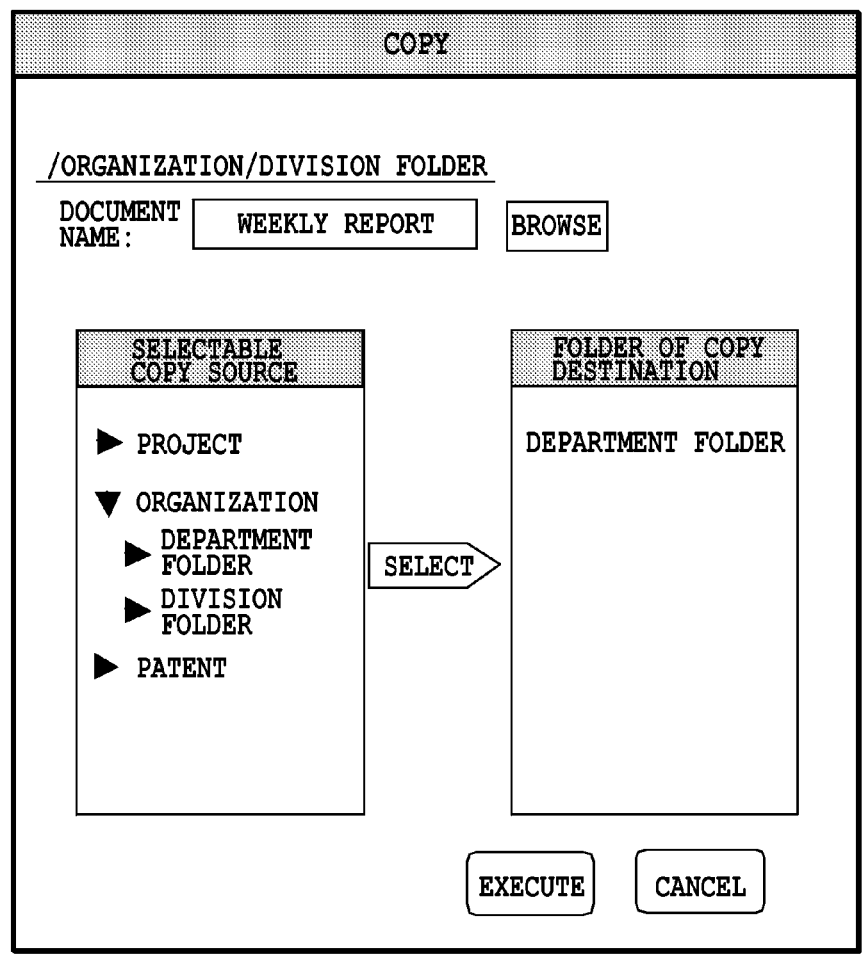
FIG. 18 is a diagram illustrating an example of a copy dialog.

In addition, FIG. 17 shows an example of the operation history when an operation content is copy. When the operation target of weekly report is clicked, a list of the functions related to copy, which is the operation content executed on the weekly report in the history, is obtained, and they are sorted in decreasing order of usage frequency. In this example, since copy has the highest frequency, re-execute is shown at the head of the list, and below, the related functions move and delete are shown. When the user selects the re-execute from the list, the user moves to a screen where copy is executed again on the document. FIG. 18 shows an example of a copy screen activated in this manner, and weekly report has been already set in the document name, therefore, the user need only select the folder of the copy destination to complete the copy of the document.

Note that, as described with reference to FIG. 13, the implementation may be such that, choices are made available on the administrator screen so as to allow the sorting algorithm to be changed, and presentation is carried out with a sorting method other than usage frequency per user.

Thus far the representative embodiment of the present invention have been described.

(Description of Terms)

Among terms used in the description of the prevent invention, those that are similar to each other and seem confusing will be additionally described.

"Operation content" refers to what the user instructs a machine to execute, among functions that the document management device of the present invention has (e.g., document registration, user creation, check-out and download). Download may be executed by the download means 207 shown in FIG. 2.

"Operation target" refers to a target on which the operation content is executed, which the user instructed the machine to execute (e.g., document image file, folder, user and group).

"Operation" means that a user instructs the machine (document image management device in the present invention) to execute the operation content on the operation target.

In "operation history", one operation per row is recorded. In addition to an operation content and an operation target, an operation date and time, an operation source and an operation destination are also recorded.

"Processing" means that, upon receiving the operation by the user, the machine (document image management device in the present invention) operates to execute the operation content on the specified operation target.

"Type of processing" refers to a unique name representing processing executed by the machine (document image management device in the present invention).

"Identification information" refers to a unique identifier such as an operation target, an operation content, and an operator memorized in the machine.

The present embodiment includes a document image management program to cause a computer to execute a document image management method applied to the document image management device described above. In addition, the present embodiment also includes computer readable storage media in which the document image management program is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-065266, filed Mar. 14, 2007 and 2008-009542, filed Jan. 18, 2008, which are hereby incorporated by reference herein in their entirety.

What is claimed is:

1. A computer comprising:
a processor;
non-transitory computer-readable storage media connected to the processor and storing a program executable by the computer;
a first processing unit performs a first process with regard to a file in response to a user selecting first information;
a first causing unit causes a display device to display a name identifying the file and second information corresponding to the first information after the first process has been performed with regard to the file;
a second causing unit causes the display device to display a function name in response to a user clicking on the name identifying the file, wherein the function name is different from the second information;
a second processing unit performs, in response to a user selecting the function name, a process corresponding to the selected function name with regard to the file corresponding to the clicked name identifying the file; and
a third causing unit causes the display device to display, in response to a user selecting the second information, a list and the name identifying the file in different areas,
wherein the list includes names identifying files with regard to which the first process has been performed except the name identifying the file,
wherein the list aligns the names identifying the files with regard to which the first process has been performed earlier than the file,
wherein the first causing unit causes the display device to display the name identifying the file and the second information corresponding to the first information in a case where an instruction to display a history is given from a user after the first process has been performed with regard to the file, and
wherein each of said units is implemented at least in part by the computer executing the program.

2. The device according to claim 1 wherein the first process includes check-out of the file, and the process corresponding to the selected function name includes check-in of the file.

3. The device according to claim 1 wherein the process corresponding to the selected function name includes a process different from a process of opening and a process of editing the file.

4. A computer-executed method comprising the steps of:
performing a first process with regard to a file in response to a user selecting first information;
causing a display device to display a name identifying the file and second information corresponding to the first information after the first process has been performed with regard to the file;
causing the display device to display a function name in response to a user clicking on the name identifying the file, wherein the function name is different from the second information;
performing, in response to a user selecting the function name, a process corresponding to the selected function name with regard to the file corresponding to the clicked name identifying the file; and
causing the display device to display, in response to a user selecting the second information, a list and the name identifying the file in different areas,
wherein the list includes names identifying files with regard to which the first process has been performed except the name identifying the file,
wherein the list aligns the names identifying the files with regard to which the first process has been performed earlier than the file,
wherein the name identifying the file and the second information corresponding to the first information are displayed on the display device in a case where an instruction to display a history is given from a user after the first process has been performed with regard to the file, and
wherein each of said steps is executed at least in part by a computer.

5. The method according to claim 4 wherein the first process includes check-out of the file, and the process corresponding to the selected function name includes check-in of the file.

6. The method according to claim 4 wherein the process corresponding to the selected function name includes a process different from a process of opening and a process of editing the file.

7. Non-transitory computer-readable storage media storing a program executable by at least one computer at least to:
perform a first process with regard to a file in response to a user selecting first information;
cause a display device to display a name identifying the file and second information corresponding to the first information after the first process has been performed with regard to the file;
cause the display device to display a function name in response to a user clicking on the name identifying the file, wherein the function name is different from the second information;
perform, in response to a user selecting the function name, a process corresponding to the selected function name with regard to the file corresponding to the clicked name identifying the file; and
cause the display device to display, in response to a user selecting the second information, a list and the name identifying the file in different areas,
wherein the list includes names identifying files with regard to which the first process has been performed except the name identifying the file,
wherein the program is executable by at least one computer at least to cause the list to align the names identifying the files with regard to which the first process has been performed earlier than the file, and
wherein the program is executable by at least one computer at least to cause the display device to display the name identifying the file and the second information corresponding to the first information in a case where an instruction to display a history is given from a user after the first process has been performed with regard to the file.

8. The non-transitory computer-readable storage media according to claim 7 wherein the first process includes check-out of the file, and the process corresponding to the selected function name includes check-in of the file.

9. The non-transitory computer-readable storage media according to claim 7 wherein the process corresponding to the selected function name includes a process different from a process of opening and a process of editing the file.

10. A computer comprising:
a processor;
non-transitory computer-readable storage media connected to the processor and storing a program executable by the computer;
a first processing unit performs a first process with regard to a file in response to a user selecting first information;

a first causing unit causes a display device to display a name identifying the file and second information corresponding to the first information after the first process has been performed with regard to the file;

a second causing unit causes the display device to display a function name in response to a user clicking on the name identifying the file, wherein the function name is different from the second information;

a second processing unit performs, in response to a user selecting the function name, a process corresponding to the selected function name with regard to the file corresponding to the clicked name identifying the file; and a third causing unit causes the display device to display, in response to a user selecting the second information, a list and the name identifying the file separately, wherein the list includes names identifying files with regard to which the first process has been performed except the name identifying the file, wherein the list aligns the names identifying the files with regard to which the first process has been performed earlier than the file, wherein the first causing unit causes the display device to display the name identifying the file and the second information corresponding to the first information in a case where an instruction to display a history is given from a user after the first process has been performed with regard to the file, and wherein each of said units is implemented at least in part by the computer executing the program.

11. A computer-executed method comprising the steps of:

performing a first process with regard to a file in response to a user selecting first information;

causing a display device to display a name identifying the file and second information corresponding to the first information after the first process has been performed with regard to the file;

causing the display device to display a function name in response to a user clicking on the name identifying the file, wherein the function name is different from the second information;

performing, in response to a user selecting the function name with regard to the file corresponding to the clicked name identifying the file, a process corresponding to the selected function name; and causing the display device to display, in response to a user selecting the second information, a list and the name identifying the file separately, wherein the list includes names identifying files with regard to which the first process has been performed except the name identifying the file, wherein the list aligns the names identifying the files with regard to which the first process has been performed earlier than the file, wherein the name identifying the file and the second information corresponding to the first information are displayed on the display device in a case where an instruction to display a history is given from a user after the first process has been performed with regard to the file, and wherein each of said steps is executed at least in part by a computer.

12. Non-transitory computer-readable storage media storing a program executable by at least one computer at least to:

perform a first process with regard to a file in response to a user selecting first information;

cause a display device to display a name identifying the file and second information corresponding to the first information after the first process has been performed with regard to the file;

cause the display device to display a function name in response to a user clicking on the name identifying the file, wherein the function name is different from the second information;

perform, in response to a user selecting the function name, a process corresponding to the selected function name with regard to the file corresponding to the clicked name identifying the file; and cause the display device to display, in response to a user selecting the second information, a list and the name identifying the file separately, wherein the list includes names identifying files with regard to which the first process has been performed except the name identifying the file, wherein the program is executable by at least one computer at least to cause the list to align the names identifying the files with regard to which the first process has been performed earlier than the file, and wherein the program is executable by at least one computer at least to cause the display device to display the name identifying the file and the second information corresponding to the first information in a case where an instruction to display a history is given from a user after the first process has been performed with regard to the file.

13. A device comprising:

a computer; and non-transitory computer-readable storage media connected to the computer and storing a program executable by the computer, wherein the program is executed by the computer at least to:

perform a first process with regard to a file in response to a user selecting first information;

cause a display device to display a name identifying the file and second information corresponding to the first information after the first process has been performed with regard to the file;

cause the display device to display a function name in response to a user clicking on the name identifying the file, wherein the function name is different from the second information;

perform, in response to a user selecting the function name, a process corresponding to the selected function name with regard to the file corresponding to the clicked name identifying the file; and cause the display device to display, in response to a user selecting the second information, a list and the name identifying the file in different areas, wherein the list includes names identifying files with regard to which the first process has been performed except the name of the file, wherein the program is executed by the computer at least to cause the list to align the names identifying the files with regard to which the first process has been performed earlier than the file, and wherein the program is executed by the computer at least to cause the display device to display the name identifying the file and the second information corresponding to the first information in a case where an instruction to display a history is given from a user after the first process has been performed with regard to the file.

* * * * *